United States Patent

Preston, Sr.

[11] Patent Number: 5,799,913
[45] Date of Patent: Sep. 1, 1998

[54] BEVERAGE HOLDING AND LOCKING DEVICE

[76] Inventor: Frederick Byron Preston, Sr., 105 Maple Ave., Pasadena, Md. 21122-4342

[21] Appl. No.: 621,984

[22] Filed: Mar. 26, 1996

[51] Int. Cl.⁶ .................................................. A47G 23/02
[52] U.S. Cl. ........................ 248/146; 248/311.2; 248/154
[58] Field of Search ........................... 248/311.2, 146, 248/150, 166, 188.91, 154; 211/71, 74; 108/25, 26

[56] References Cited

U.S. PATENT DOCUMENTS

| | | | |
|---|---|---|---|
| 117,737 | 8/1871 | Byram | 108/26 |
| 458,962 | 9/1891 | Willershausen | 108/25 |
| 3,119,641 | 1/1964 | Rand | 108/26 |
| 4,182,265 | 1/1980 | Bracher | 248/311.2 X |
| 4,395,013 | 7/1983 | Wissinger | 248/311.2 X |
| 5,337,984 | 8/1994 | Houck | 248/146 |
| 5,427,292 | 6/1995 | Rousch | 108/25 X |
| 5,445,350 | 8/1995 | Rigsby | 248/311.2 X |

FOREIGN PATENT DOCUMENTS

| | | | |
|---|---|---|---|
| 856655 | 12/1960 | United Kingdom | 248/311.2 |
| 2140290 | 11/1984 | United Kingdom | 108/25 |

Primary Examiner—Daniel P. Stodola
Assistant Examiner—Gregory J. Strimbu

[57] ABSTRACT

A beverage holding device including a central rack portion having downturned side portions. The central rack portion has a pair of diamond shaped openings therethrough. Each of the openings has an upper apex, a lower apex, and two intermediate apexes therebetween. The lower apex has a square opening extending coextensively therefrom. The device includes a pair of sliding lock bars each having an angular recess formed in a rear surface thereof. Each lock bar has an elongated recess formed therethrough. The lock bars are slidably coupled to the lower surface of the central rack portion whereby the angular recess abuts the upper apex of a respective diamond shaped opening in an open orientation. The lock bars are operable to an opened or a closed orientation for engaging or disengaging a beverage container.

1 Claim, 3 Drawing Sheets

BEVERAGE HOLDING AND LOCKING DEVICE

BACKGROUND OF THE INVENTION

1. Field of the Invention

The present invention relates to a beverage holding device and more particularly pertains to positioning an a floor of a vehicle for engaging a beverage container with a beverage holding device.

2. Description of the Prior Art

The use of concession trays is known in the prior art. More specifically, concession trays heretofore devised and utilized for the purpose of carrying beverages are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,118,063 to Young, Sr. discloses a concession tray.

U.S. Pat. No. 5,316,173 to Emery discloses a carry out tray.

U.S. Pat. No. Des. 311,301 to Starnes discloses the ornamental design for a food and beverage carrying tray.

U.S. Pat. No. 5,348,218 to Haire et al. discloses a concession tray.

U.S. Pat. No. 4,718,555 to Amberg discloses a carrying tray.

U.S. Pat. No. Des. 256,081 to Patterson et al. discloses the ornamental design for a beverage carrying tray.

While these devices fulfill their respective, particular objective and requirements, the aforementioned patents do not describe a beverage holding device for positioning an a floor of a vehicle for engaging a beverage container.

In this respect, the beverage holding device according to the present invention substantially departs from the conventional concepts and designs of the prior art, and in doing so provides an apparatus primarily developed for the purpose of positioning an a floor of a vehicle for engaging a beverage container.

Therefore, it can be appreciated that there exists a continuing need for new and improved beverage holding device which can be used for positioning an a floor of a vehicle for engaging a beverage container. In this regard, the present invention substantially fulfills this need.

SUMMARY OF THE INVENTION

In the view of the foregoing disadvantages inherent in the known types of concession trays now present in the prior art, the present invention provides an improved beverage holding device. As such, the general purpose of the present invention, which will be described subsequently in greater detail, is to provide a new and improved beverage holding device and method which has all the advantages of the prior art and none of the disadvantages.

To attain this, the present invention essentially comprises a central rack portion having a generally rectangular configuration. The central rack portion has planar upper and lower surfaces. The central rack portion has downturned side portions. The downturned side portions have an extension member hingedly secured to a lower edge thereof. Each extension member has an elongated horizontal slot therethrough. A lower surface of each slot has an upwardly extending portion extending a length thereof. The central rack portion has a pair of diamond shaped openings therethrough. Each of the openings has an upper apex, a lower apex, and two intermediate apexes therebetween. The lower apex has a square opening extending coextensively therefrom. The device includes a cross member having planar upper and lower surfaces. The lower surface has elongated recesses formed therein inwardly of side edges thereof. The cross member is adapted for securement between the horizontal slots of the extension members of the central rack portion with the recesses coupled with upwardly extending portions of the slots. The device includes a pair of sliding lock bars each having a generally square configuration. Each lock bar has an angular recess formed in a rear surface thereof. Each lock bar has an elongated recess formed therethrough. The lock bars are slidably coupled to the lower surface of the central rack portion whereby the angular recess abuts the upper apex of a respective diamond shaped opening in an open orientation. A pair of locking handles slidably couple the pair of sliding locking bars to the central rack portion. The locking handles each receive a locking bolt. Each locking bolt extends upwardly through the elongated recess of a respective lock bar through an aperture in the central rack portion for adjustable coupling with a respective locking handle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beverage holding device which has all the advantages of the prior art concession trays and none of the disadvantages.

It is another object of the present invention to provide a new and improved beverage holding device which may be easily and efficiently manufactured and marketed.

3

It is a further object of the present invention to provide a new and improved beverage holding device which is of durable and reliable construction.

An even further object of the present invention is to provide a new and improved beverage holding device which is susceptible of a low cost of manufacture with regard to both materials and labor, and which accordingly is then susceptible of low prices of sale to the consuming public, thereby making such a beverage holding device economically available to the buying public.

Still yet another object of the present invention is to provide a new and improved beverage holding device which provides in the apparatuses and methods of the prior art some of the advantages thereof, while simultaneously overcoming some of the disadvantages normally associated therewith.

Even still another object of the present invention is to provide a new and improved beverage holding device for positioning an a floor of a vehicle for engaging a beverage container.

Lastly, it is an object of the present invention to provide a new and improved beverage holding device including a central rack portion having downturned side portions. The central rack portion has a pair of diamond shaped openings therethrough. Each of the openings has an upper apex, a lower apex, and two intermediate apexes therebetween. The lower apex has a square opening extending coextensively therefrom. The device includes a pair of sliding lock bars each having an angular recess formed in a rear surface thereof. Each lock bar has an elongated recess formed therethrough. The lock bars are slidably coupled to the lower surface of the central rack portion whereby the angular recess abuts the upper apex of a respective diamond shaped opening in an open orientation. The lock bars are operable to an opened or a closed orientation for engaging or disengaging a beverage container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to annexed drawings wherein.

The same reference numerals refer to the same parts through the various Figures.

4

DESCRIPTION OF THE PREFERRED EMBODIMENT

Figure 1:
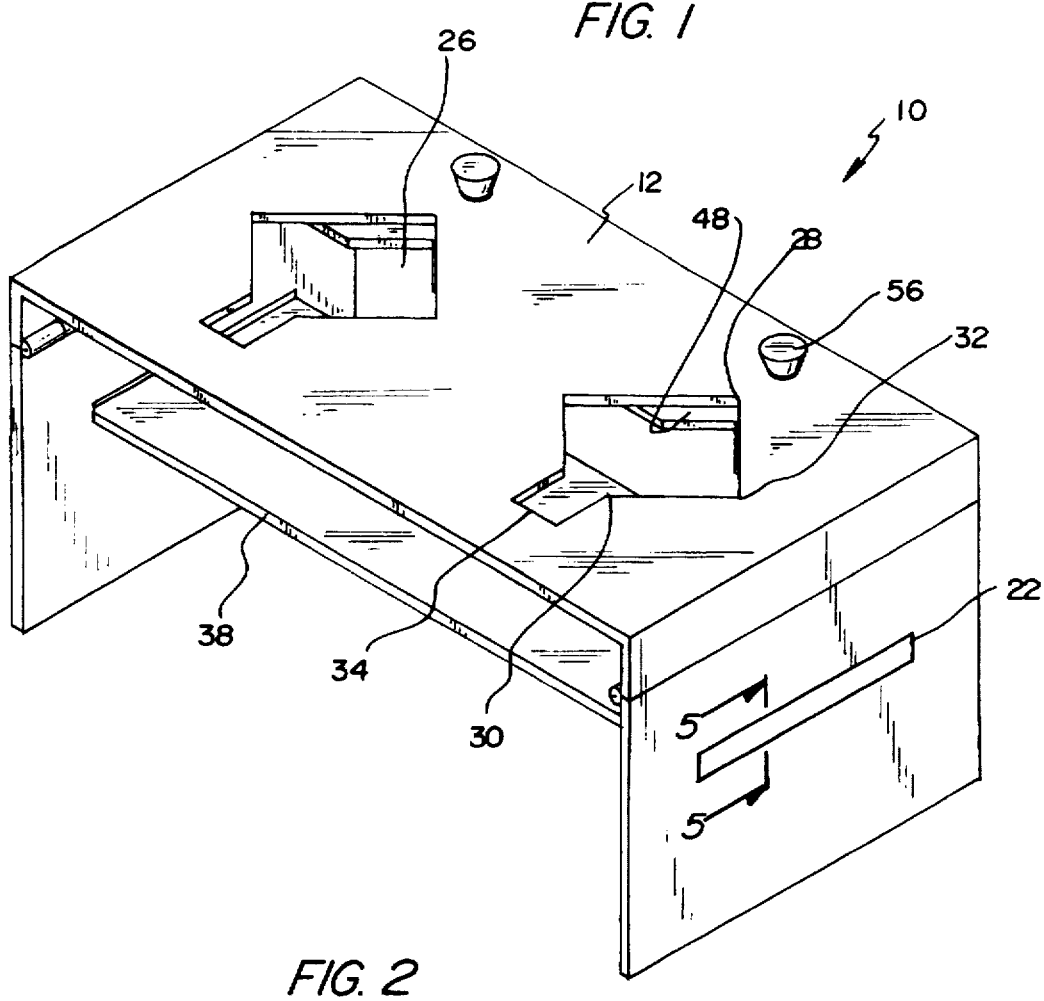
FIG. 1 is a perspective view of the preferred embodiment of the beverage holding device constructed in accordance with the principles of the present invention.
Figure 2:
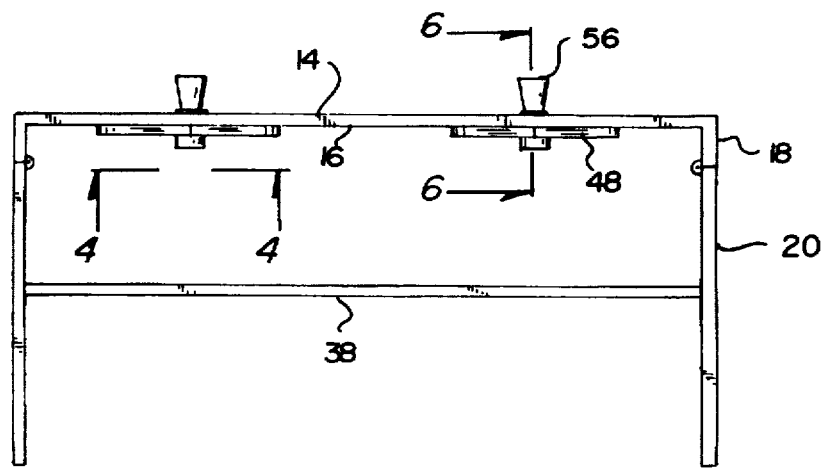
FIG. 2 is a front elevation view of the present invention.
Figure 3:
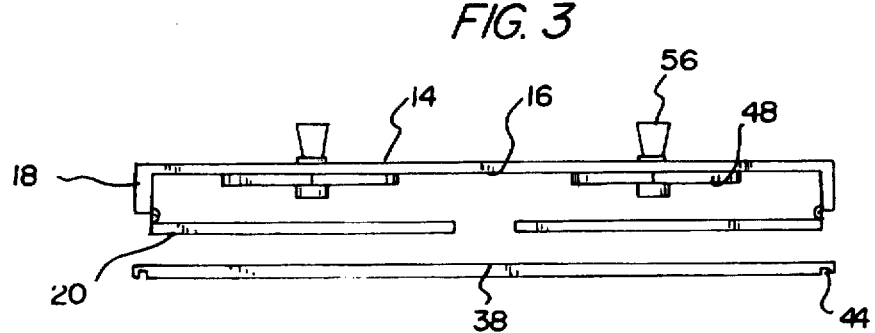
FIG. 3 is a front elevation view of the present invention in a folded configuration.
Figure 4:
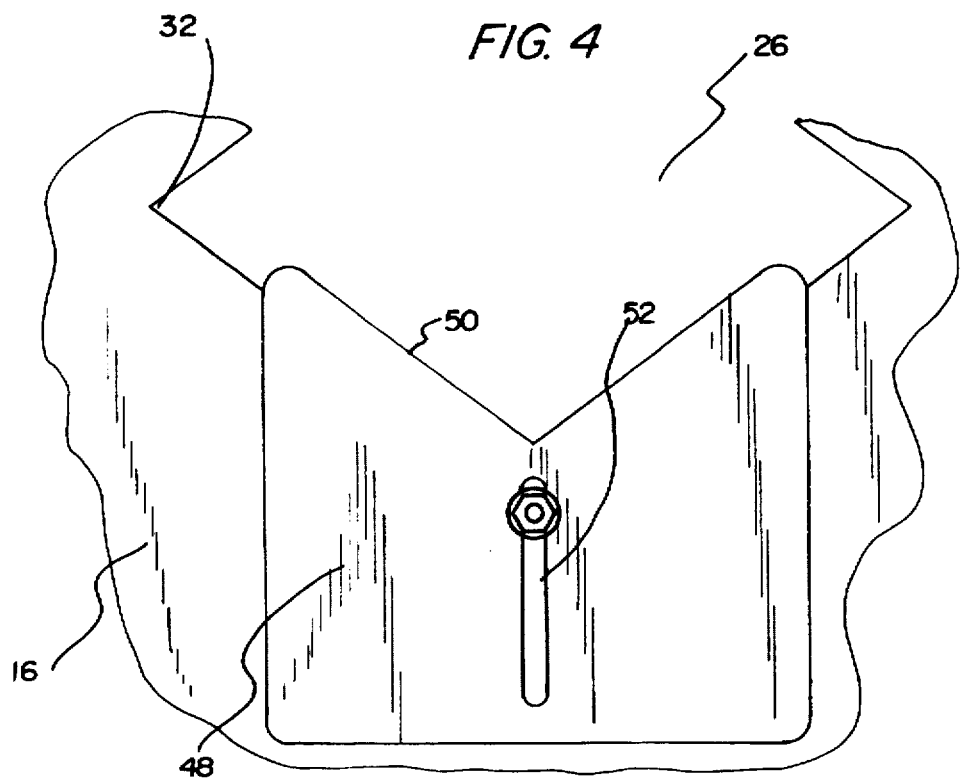
FIG. 4 is a bottom view of the sliding lock bar of the present invention as taken along line 4—4 of FIG. 2.
Figure 5:
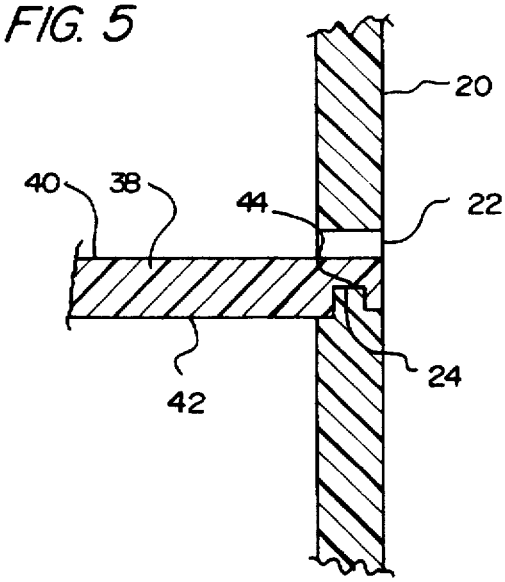
FIG. 5 is a cross-sectional view as taken along line 5—5 of FIG. 1.
Figure 6:
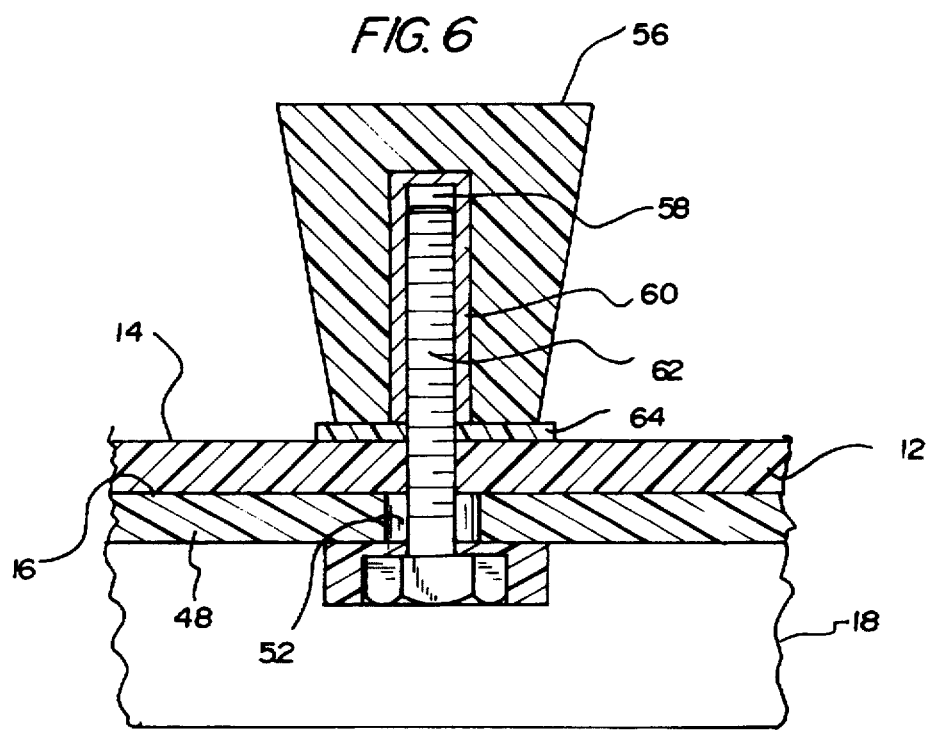
FIG. 6 is a cross-sectional view as taken along line 6—6 of FIG. 2.

With reference now to the drawings, and in particular, to FIGS. 1–6 thereof, the preferred embodiment of the new and improved beverage holding device embodying the principles and concepts of the present invention and generally designated by the reference number 10 will be described.

Specifically, it will be noted in the various Figures that the device relates to a new and improved beverage holding device for positioning an a floor of a vehicle for engaging a beverage container. In its broadest context, the device consists of a central rack portion, a cross member, a pair of sliding lock bars, and a pair of locking handles. Such components are individually configured and correlated with respect to each other so as to attain the desired objective.

The device 10 includes a central rack portion 12 having a generally rectangular configuration. The central rack portion 12 has planar upper 14 and lower surfaces 16. The central rack portion 14 has downturned side portions 18. The downturned side portions 18 have an extension member 20 hingedly secured to a lower edge thereof. The extension members 20 can be extended to an open position in a linear relationship with the downturned side portions 18 for securement to a floor area of a vehicle or to a stowed position where the extension members 20 are closed inwardly to a position perpendicular to the side portions 18 and parallel with the central rack portion 12. Each extension member 20 has an elongated horizontal slot 22 therethrough. The slot 22 is positioned intermediate of side edges of the extension members 20 and thereby intermediate of side edges of the central rack portion 12. A lower surface of each slot 22 has an upwardly extending portion 24 extending a length thereof. The central rack portion 12 has a pair of diamond shaped openings 26 therethrough. Each of the openings 26 has an upper apex 28, a lower apex 30, and two intermediate apexes 32 therebetween. The openings 26 are positioned intermediate of the side edges of the central rack portion 12 thereby the openings 26 are vertically aligned with the slots 22 in the extension members 20. The lower apex 30 has a square opening 34 extending coextensively therefrom.

Next, the device 10 includes a cross member 38 having planar upper 40 and lower surfaces 42. The lower surface 42 has elongated recesses 44 formed therein inwardly of side edges thereof. The cross member 38 is adapted for securement between the horizontal slots 22 of the extension members 20 of the central rack portion 12 with the recesses 44 coupled with upwardly extending portions 24 of the slots 22. The cross member 38 is positioned within the slots 22 disposed beneath the diamond shaped openings 26 within the central rack portion 12.

The device 10 also includes a pair of sliding lock bars 48 each having a generally square configuration. Each lock bar 48 has an angular recess 50 formed in a rear surface thereof. Each lock bar 48 has an elongated recess 52 formed therethrough. The lock bars 48 are slidably coupled to the lower surface 16 of the central rack portion 12 whereby the angular recess 50 abuts the upper apex 28 of a respective diamond shaped opening 26 in an open orientation. The angle formed by the angular recess 50 is equal to the angle formed by the upper apex 28. The elongated recess 52 has a length equal to about half of the length of the lock bar 48.

Lastly, a pair of locking handles 56 slidably couple the pair of sliding locking bars 48 to the central rack portion 12. The locking handles 48 each having an opening 58 extending upwardly therein. The opening 58 has a metal insert 60 disposed therein. Each metal insert receives a locking bolt 62 therein. Each locking bolt 62 extends upwardly through the elongated recess 52 of a respective lock bar 48 through an aperture in the central rack portion 12 for adjustable coupling with a respective locking handle 56. A washer 64 is positioned between a lower end of the locking handle 56 and the upper surface 14 of the central rack portion 12. A user simply turns the locking handle 56 to loosen the locking bolt 62 from the lock bar 48 to allow for the lock bar 48 to slide along the lower surface 16 of the central rack portion 12 with the bolt 62 loosely engaged with the elongated recess 52. The user places a container through one of the diamond shaped openings 26 onto the cross member 38. The lock bar 48 is then slid to snugly position the angular recess 50 against one side of the container while an opposed side of the container snugly abuts the lower apex 30 or the square opening 34. This would prevent tipping or spilling of the containers during the operation of a vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A beverage holding and locking device for positioning on a floor of a vehicle for engaging a beverage container comprising, in combination:

a central rack portion having a generally rectangular configuration, the central rack portion having planar upper and lower surfaces, the central rack portion having downturned side portions, the downturned side portions each having an extension member hingedly secured to a lower edge thereof such that the extension members can be extended to an open position where each extension member is coplanar with a respective said downturned side portion for securement to the floor of the vehicle and to a stowed position where the extension members are closed inwardly to a position perpendicular to the downturned side portions and parallel with the central rack portion, each of the extension members having an elongated horizontal slot therethrough, said slots positioned intermediate of side edges of the extension members and intermediate of side edges of the central rack portion, a lower surface of each said slot having an upwardly extending portion extending a length of the slot, the central rack portion having a pair of substantially diamond shaped openings therethrough, said openings positioned intermediate of the side edges of the central rack portion, each of the openings having an upper apex, a lower apex, and two intermediate apexes therebetween, each lower apex having a square opening extending coextensively therefrom;

a cross member having planar upper and lower surfaces, the lower surface of the cross member having two elongated recesses formed therein inwardly of side edges thereof, the cross member secured between the slots of the extension members of the central rack portion with each of the recesses coupled with a respective said upwardly extending portion, wherein the cross member is disposed beneath the substantially diamond shaped openings of the central rack portion;

a pair of sliding lock bars each having a generally square configuration, each of the lock bars having an angular recess formed in a rear surface thereof, each of the lock bars having an elongated recess formed therethrough, the lock bars being slidably coupled to the lower surface of the central rack portion whereby the angular recess of each said lock bar is aligned with the upper apex of a respective said substantially diamond shaped opening in a first orientation;

a pair of elastomeric locking handles, the locking handles each receiving a locking bolt within a metal insert disposed therein, each of the locking bolts extending upwardly through the elongated recess of a respective said lock bar and through an aperture in the central rack portion to slidably couple the lock bars to the central rack portion, a washer being positioned between a lower end of each of the locking handles and the upper surface of the central rack portion and an axis of each of the locking bolts being perpendicular to the upper and lower surfaces of the central rack portion, wherein loosening of the locking bolts from the locking handles allows for the lock bars to slide along the lower surface of the central rack portion.

* * * * *